United States Patent
Al-Qahtani

(10) Patent No.: US 10,597,297 B2
(45) Date of Patent: Mar. 24, 2020

(54) ENRICHED ACID GAS FOR SULFUR RECOVERY

(71) Applicant: Saudi Arabian Oil Company, Dhahran (SA)

(72) Inventor: Nasser A. Al-Qahtani, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/598,775

(22) Filed: Oct. 10, 2019

(65) Prior Publication Data

US 2020/0048090 A1    Feb. 13, 2020

Related U.S. Application Data

(62) Division of application No. 15/681,093, filed on Aug. 18, 2017, now Pat. No. 10,479,685.

(51) Int. Cl.
*C01B 17/16* (2006.01)
*B01D 3/14* (2006.01)
*B01D 53/14* (2006.01)

(52) U.S. Cl.
CPC ........ *C01B 17/167* (2013.01); *B01D 53/1412* (2013.01); *B01D 53/1462* (2013.01); *B01D 53/1493* (2013.01); *B01D 2252/20405* (2013.01); *B01D 2252/20431* (2013.01); *B01D 2252/20489* (2013.01)

(58) Field of Classification Search
CPC .. C01B 17/16; B01D 3/16; B01D 3/14; B01D 3/10
See application file for complete search history.

(56) References Cited

U.S. PATENT DOCUMENTS

| | | |
|---|---|---|
| 6,506,349 B1 | 1/2003 | Khanmamedov |
| 7,147,691 B2 | 12/2006 | Palmer |
| 7,635,408 B2 | 12/2009 | Mak |
| 8,845,788 B2 | 9/2014 | Mak |
| 2009/0092524 A1 | 4/2009 | Ravikumar et al. |
| 2010/0219061 A1 | 9/2010 | Al Utaibi et al. |

(Continued)

FOREIGN PATENT DOCUMENTS

CA    2461952    9/2005

OTHER PUBLICATIONS

Chow et al., "Cost Effective Sulfur Recovery Solutions for Canada's Greener Environment," paper 2004-050, presented at the Petroleum Society's 5th Canadian International Petroleum Conference (55th Annual Technical Meeting) Jun. 8-10, 2004, 13 pages.

(Continued)

*Primary Examiner* — Youngsul Jeong
(74) *Attorney, Agent, or Firm* — Fish & Richardson P.C.

(57) ABSTRACT

A system of enriching acid gas for feeding a sulfur recovery unit includes a contactor configured to separate an acid gas stream into a carbon dioxide rich stream and a purified acid gas stream, where the acid gas stream includes hydrogen sulfide, carbon dioxide, and hydrocarbons; a regenerator in fluid communication with the contactor such that the regenerator is configured to separate the purified acid gas stream to create a hydrogen sulfide rich stream and a hydrogen sulfide lean stream; and a recycle stream conduit fluidly coupled between the regenerator to the contactor and configured to supply at least a portion of the hydrogen sulfide rich stream from the regenerator to the contactor.

20 Claims, 5 Drawing Sheets

(56) References Cited

U.S. PATENT DOCUMENTS

2011/0168019 A1     7/2011   Northrop et al.
2011/0268650 A1   11/2011   Lamar

OTHER PUBLICATIONS

Chow et al., "Gas Processes Handbook 2004," presented at the World Petroleum Congress, Second Regional Meeting, Gulf Publishing Company, 2004, 194 pages.
"Hydrocarbon Processing," hydrocarbonprocessing.com, Jan. 2011, 96 pages.
International Search Report and Written Opinion issued in International Application No. PCT/US2018/046899 dated Nov. 26, 2018, 15 pages.
Khanmamedov and Weiland, "Upgrading acid gas streams," Acid Gas Enrichment, Sulphur 318, Sep.-Oct. 2008, 5 pages.
Moiolli et al., "Use of recycle for H2S removal by MDEA scrubbing in IGCC systems," Chemical Engineering Transactions, Jun. 30, 2017, 6 pages.
Weiland, "Acid gas enrichment I: Maximizing selectivity," proceedings of the Laurence Reid Gas Conditioning Conference, vol. 2008, Feb. 2008, 4 pages.
Zarenezhad, "Improve operations of your Claus unit," Clean Fuels, Special Report, Hydrocarbon Processing, Feb. 2009, 7 pages.

ENRICHED ACID GAS FOR SULFUR RECOVERY

CROSS-REFERENCE TO RELATED APPLICATION

This application is a divisional of, and claims priority to, U.S. patent application Ser. No. 15/681,093, filed on Aug. 18, 2017, and entitled "ENRICHED ACID GAS FOR SULFUR RECOVERY," the entire contents of which are incorporated by reference herein.

TECHNICAL FIELD

This disclosure relates to systems and methods relating to enriching an acid gas for a sulfur recovery process.

BACKGROUND

Sour natural gas compositions can vary widely in concentrations of hydrogen sulfide ($H_2S$), carbon dioxide ($CO_2$), and hydrocarbon components. The removal of $H_2S$ from sour natural gas is referred to as a sweetening process. Excess $H_2S$ can be separated from the sour natural gas and sent to a sulfur recovery unit (SRU) when the $H_2S$ content exceeds a sales gas specification limit. However, if the $H_2S$ content does not exceed the sales gas specification limit, alternative means for disposing the $H_2S$ can be limited and costly. For example, worldwide regulations generally limit the flaring of $H_2S$ as a form of $H_2S$ disposal.

SUMMARY

This specification describes technologies and methods relating to an acid gas enrichment process for increasing a concentration level of hydrogen sulfide ($H_2S$) in an enriched acid gas.

In a first aspect, a method of sulfur enriching an acid gas stream in an acid gas enrichment system includes: (i) feeding an acid gas stream to a contactor, the acid gas stream comprising hydrogen sulfide ($H_2S$), carbon dioxide ($CO_2$), and hydrocarbons; (ii) separating the acid gas stream in the contactor to create a carbon dioxide rich stream and a purified acid gas stream; (iii) feeding the purified acid gas stream to a regenerator fluidly connected to the contactor; (iv) separating the purified acid gas stream in the regenerator to create a hydrogen sulfide rich stream and a hydrogen sulfide lean stream, the hydrogen sulfide rich stream having a concentration of hydrogen sulfide; and (v) periodically feeding at least a portion of the hydrogen sulfide rich stream exiting the regenerator to the acid gas stream entering the contactor.

In some embodiments, the periodically feeding step comprises adjusting a recycle valve disposed along a fluid pathway that directs the hydrogen sulfide rich stream exiting the regenerator to the acid gas stream entering the contactor. In some embodiments, the adjusting the recycle valve comprises opening or closing the recycle valve based on $H_2S$ content in the hydrogen sulfide rich stream. In some embodiments, the adjusting the recycle valve comprises opening the recycle valve when the $H_2S$ content in the hydrogen sulfide rich stream is less than 35% wt. In some embodiments, the adjusting the recycle valve comprises closing the recycle valve when the $H_2S$ content in the hydrogen sulfide rich stream is greater than or equal to 75% wt.

In some embodiments, the adjusting the recycle valve comprises closing the recycle valve when a threshold mass flow of the recycled enriched gas from the regenerator is 20% wt or greater than the acid gas stream to contactor. In some embodiments, the adjusting the recycle valve comprises closing the recycle valve when on $H_2S$ content in the carbon dioxide rich stream is at least 500 ppm. In some embodiments, the method further comprising removing at least a portion of the hydrogen sulfide rich stream exiting from the regenerator from an acid gas enrichment system. In some embodiments, the method further comprising periodically removing at least a portion of the hydrogen sulfide rich stream exiting from the regenerator from an acid gas enrichment system.

In a second aspect, a system of enriching acid gas for feeding a sulfur recovery unit comprises: (i) a contactor configured to separate an acid gas stream into a carbon dioxide rich stream and a purified acid gas stream, the acid gas stream comprising hydrogen sulfide, carbon dioxide, and hydrocarbons; (ii) a regenerator in fluid communication with the contactor such that the regenerator is configured to separate the purified acid gas stream to create a hydrogen sulfide rich stream and a hydrogen sulfide lean stream, the hydrogen sulfide rich stream having a concentration of hydrogen sulfide; and (iii) a recycle stream conduit fluidly coupled between the regenerator to the contactor and configured to supply at least a portion of the hydrogen sulfide rich stream from the regenerator to the contactor.

In some embodiments, the system comprises an acid gas recycle valve coupled to the recycle stream conduit that opens and closes a fluid pathway from the regenerator to the contactor. In some embodiments, the system comprises an acid gas recycle valve coupled to the recycle stream conduit that adjusts a flowrate of a fluid pathway from the regenerator to the contactor. In some embodiments, the system comprises a single contactor. In some embodiments, the system is exclusive of a vacuum spool or a compressor for the contactor.

In a third aspect, a system of enriching acid gas for feeding a sulfur recovery unit includes: (i) a contactor configured to separate an acid gas stream into a carbon dioxide rich stream and a purified acid gas stream, the acid gas stream comprising hydrogen sulfide, carbon dioxide, and hydrocarbons; (ii) a regenerator in fluid communication with the contactor, the regenerator configured to separate the purified acid gas stream to create a hydrogen sulfide rich stream and a hydrogen sulfide lean stream, the hydrogen sulfide rich stream having a concentration of hydrogen sulfide; and (iii) a controller configured to operate a recycle valve, wherein the recycle valve, when in an open state, is configured to separate at least a portion of the hydrogen sulfide rich stream exiting from the regenerator and to feed the portion of the hydrogen sulfide rich stream to the contactor, and wherein the recycle valve, when in an closed state, is configured to purge an entire hydrogen sulfide rich stream exiting from the regenerator.

In some embodiments, the controller is configured to open, partially open, or close the recycle valve. In some embodiments, the controller is configured to open the recycle valve when $H_2S$ content in the hydrogen sulfide rich stream is less than 35% wt. In some embodiments, the controller is configured to close the recycle valve when $H_2S$ content in the hydrogen sulfide rich stream is greater than or equal to 75% wt. In some embodiments, the controller is configured to close the recycle valve when $H_2S$ content in the carbon dioxide rich stream is greater than or equal to 500 ppm. In some embodiments, the controller is configured to close the recycle valve when a total mass flow of the recycled enriched gas from the regenerator is 20% wt. or greater than the acid gas stream to contactor.

In example implementations of the present disclosure, "sour gas" is natural gas or any other gas containing significant amounts of hydrogen sulfide, for example, greater than 5.7 milligrams (mg) of $H_2S$ per cubic meter of natural gas, or at least 4 ppm by volume of $H_2S$ under standard temperature and pressure.

A "sweet gas" is natural gas that does not contain significant amounts of hydrogen sulfide, for example, less than 5.7 mg of $H_2S$ per cubic meter of natural gas, or less than 4 ppm by volume of $H_2S$ under standard temperature and pressure. The term "sweetening" is a process that removes $H_2S$ and other organosulfur compounds at an oil refinery or a natural gas processing plant.

A "turn-down-ratio" (TDR), as provided in example implementations of this disclosure, is the ratio of the maximum capacity to minimum capacity. TDR relates to the width of the operational range of a system, for example, the ratio of a design feed rate to a lowest available feed rate.

The features associated with the present disclosure include achieving a significant increase of $H_2S$ concentration in an enriched acid gas, which feeds to a sulfur recovery unit (SRU), using systems and methods of recycling enriched acid gas as disclosed herein. Certain embodiments of the systems and methods of the present disclosure can improve the $H_2S$ concentration of the enriched acid gas, for example, by about 70%-80% as compared to systems and methods that do not recycle enriched acid gas, based on simulation-based enriched gas $H_2S$ concentration values of the stripper (regenerator) gas outlet as compared to off-gas concentration values from the amine contactor. Certain embodiments of the systems and methods described herein can advantageously reduce the $CO_2$ concentration of the enriched acid gas, for example, by about 15% mole $CO_2$ to about 36% mole $CO_2$, to allow for increased capacity and sulfur production at the SRU. Simulation results of the system and methods described herein show that recycle enriched acid gas can improve the SRU feeds by 36%, as compared to the 18% associated with systems and methods that do not recycle enriched acid gas. The improved enrichment process described herein can also optimize an acid enrichment process by reducing contactor solvent (amine) losses in the system. In some embodiments, solvent losses can be reduced by about 50%.

The systems and methods provided herein can provide the benefit of reprocessing enriched acid gas without the use of duplicate equipment or systems. Eliminating the need to use additional AGE systems and equipment to further process the enriched acid gas can reduce operational costs and equipment expenses as well as increase process efficiency and improve gas product yields.

Certain embodiments of the systems and methods provided herein can provide an added benefit of reducing fuel gas co-firing in the SRU as the level of acid gas increases in the SRU feed. This fuel gas co-firing reduction can improve catalyst performance and/or reduce $H_2S$ breakthrough in a given system.

The present disclosure includes one or more of the following units of measure with their corresponding abbreviations, as shown in Table 1:

TABLE 1

| Unit of Measure | Abbreviation |
| --- | --- |
| Degrees Celsius | °C. |
| Megawatts | MW |
| One million | MM |
| British thermal unit | Btu |
| Grams (weight) | g |
| Hour | h |
| Pounds per square inch (pressure) | psi |
| Kilogram (mass) | Kg |
| Second | S |
| Cubic meters per day | m³/day |
| Fahrenheit | F. |

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

This specification describes technologies and methods relating to an acid gas enrichment process that increase a concentration level of hydrogen sulfide ($H_2S$) in an enriched acid gas.

Figure 1:
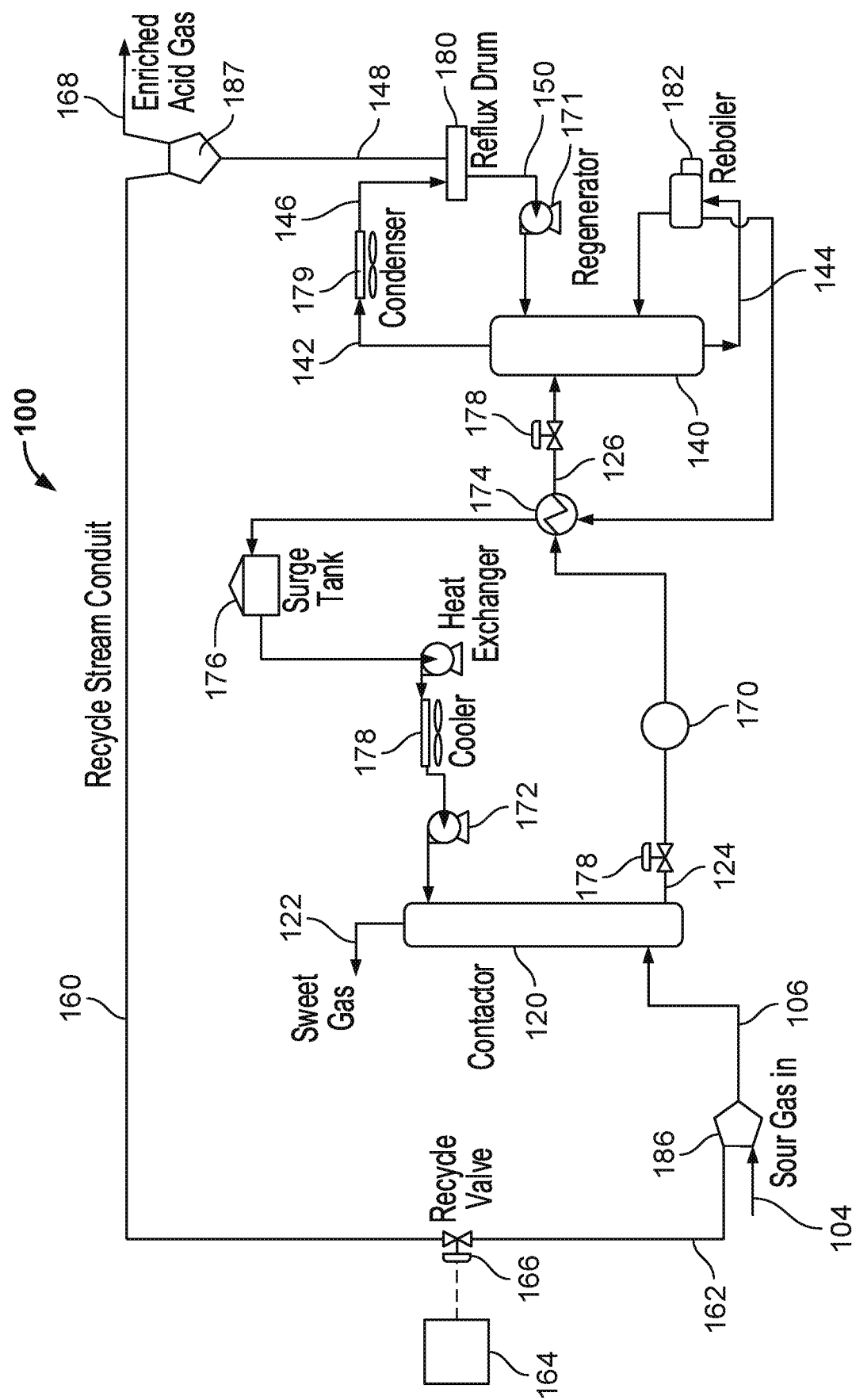
FIG. 1 is a diagram of an example acid gas enrichment system that recycles enriched acid gas to optimize the hydrogen sulfide content in the enriched acid gas.

FIG. 1 shows a schematic diagram of an example system 100 to sweeten an acid gas that enters as an acid gas input stream 104 (may also be referred to as sour natural gas) and enrich the acid gas input stream 104 to feed a sulfur recovery unit. The example system 100 includes an acid gas enrichment (AGE) contactor 120 (also referred to as an absorber), which receives an acid gas stream 106 containing the acid gas input stream 104 (along with a recycled acid gas stream 162, which will be discussed later). An acid gas stream 106 is a gas stream containing hydrogen sulfide ($H_2S$). In some embodiments, the acid gas stream 106 contains less than about 55 mole percent of $H_2S$. In some embodiments, acid gas stream 106 contains between about 15 and about 55 mole percent of $H_2S$, between about 15 and about 50 mole percent of $H_2S$, between about 15 and about 45 mole percent of $H_2S$, between about 25 and about 55 mole percent of $H_2S$, between about 35 and about 50 mole percent of $H_2S$, or between about 40 and about 45 mole percent of $H_2S$. In some embodiments, the acid gas stream 106 can contain greater than 15 mole percent of $H_2S$. The acid gas stream 106 can include $H_2S$, $CO_2$, hydrocarbons, and other contaminants. In some embodiments, the hydrocarbons present in the acid gas stream 106 can include benzene, toluene, ethyl benzene, and xylene. In some embodiments, the hydrocarbons present in the acid gas stream 106 can further include alkanes, alkenes, olefins. In some embodiments, the contaminants present in acid gas stream 106 can include mercaptans, thiols, carbonyl sulfide, carbon disulfide, and combinations thereof.

The contactor 120 separates the acid gas stream 106 into a carbon dioxide rich stream (which may also be referred to as a hydrocarbon rich stream) 122 and a purified acid gas stream 124. The carbon dioxide rich stream is rich in $CO_2$ and hydrocarbons, and lean in $H_2S$. The carbon dioxide rich stream is commonly referred to as a sweet gas. The carbon dioxide rich stream can contain about 70 to about 99 mole percent of $CO_2$, about 85 to about 99% mole percent of $CO_2$, or greater than 89 mole percent of $CO_2$. The carbon dioxide rich stream can be further processed by other systems (not shown) for carbon source recovery, hydrocarbon recovery, or both.

As shown in FIG. 1, the example system 100 includes an acid gas enrichment (AGE) regenerator 140 (may also be referred to as an amine stripper) which is in fluid communication with the contactor 120. The regenerator 140 receives the purified acid gas stream 124 from the contactor 120 and separates the purified acid gas stream 124 into a hydrogen sulfide rich stream 142 and a hydrogen sulfide lean stream 144. The hydrogen sulfide rich stream 144 has a significantly higher concentration of hydrogen sulfide than the hydrogen sulfide lean stream 142, for example, a ratio of the molar amount of hydrogen sulfide in the hydrogen sulfide rich stream 144 and the hydrogen sulfide hydrogen sulfide lean stream 142 can be about 40.

The example system 100 further includes a recycle stream conduit 160 that supplies a portion of the hydrogen sulfide rich stream 162 outputted from the regenerator 140 back to the contactor 120. The recycle stream conduit 160 is fluidly coupled (either directly or indirectly) to the regenerator 140 and the contactor 120. As shown, the recycle steam conduit 160 is coupled to regenerator 140 via a reflux drum 180 (also referred to as a separator). A portion of the hydrogen sulfide rich stream 142 exiting from the reflux drum 180 is recycled back from the regenerator 140 to the contactor 120. In this example system 100, three pumps 170,171,172, one heat exchanger 174, a surge tank 176, a cooler 178, a condenser 179, a reflux drum 180, a reboiler 182, and various valves 184 and connectors 186, 187 are used to sweeten and enrich the acid gas in the system 100.

In general, this specification discloses a method of sulfur enriching an acid gas stream using the acid gas enrichment system 100 described herein. The method includes feeding the acid gas stream 104, 106, which contains hydrogen sulfide, carbon dioxide, and hydrocarbons, to the contactor 120. The method includes separating the acid gas stream 104 in the contactor 120 to create the carbon dioxide rich stream 122 and the purified acid gas stream 124, and feeding the purified acid gas stream 124 to the regenerator 140, which is fluidly connected to the contactor 120. The method also includes separating the purified acid gas stream 124 in the regenerator 140 to create the hydrogen sulfide rich stream 142 and the hydrogen sulfide lean stream 144. The hydrogen sulfide rich stream 142 has a concentration of hydrogen sulfide that is greater than the hydrogen sulfide lean stream 144. The method includes periodically recycling at least a portion of the hydrogen sulfide rich stream 162 exiting the regenerator 140 back to the contactor 120. In some embodiments, the periodic feeding step includes using a controller 164 to open and close a valve 166 disposed along a fluid pathway (for example, the recycle stream conduit) that directs the hydrogen sulfide rich stream 162 exiting the regenerator 140 to the acid gas stream 106 entering the contactor 120.

In the example system 100, the contactor 120 is the first vessel in the system 100. The contactor 120 is an 8-tray column that receives sour acid gas 106 at the lower portion of the column. The contractor 120 introduces a lean solution containing a solvent (which can also be referred to as a sweetening solvent) in water at the top of the column. The solvent typically includes an amine acid, for example, solvent containing 30% wt. of methyl di-ethanolamine (MDEA). The solvent interacts with the sour gas 106 as the gas flows upward through column of the contractor 120 and separates $H_2S$ (and optionally the $CO_2$, depending on the solvent used) from the acid gas 106. The gas 122 that reaches the top of the contactor has become a sweet gas. In some embodiments, the contactor 120 can include a column containing 8 to 24 trays (for example, 8, 9, 10, 11, 12, 13, 14, 15, 16, 17, 18, 19, 20, 21, 22, 23, or 24 trays). In some embodiments, the contactor 120 can be a packed column. In some embodiments, the system 100 includes only a single contactor 120 because the recycle stream conduit 160 (which will be discussed in later sections) provides the advantage of returning at least a portion of the acid gas product exiting from the regenerator 140 back to the contactor 120.

As shown, the purified acid gas stream 124 exits from a bottom part of the contactor 120. The purified acid gas stream 124 is pumped through a heat exchanger 174, which is heated by the regenerated lean solution stream 144. The heated purified acid gas stream 126 then flows into a top part of the regenerator 140, the second vessel in the system 100.

In the example system 100, the regenerator 140 is an 11-tray column that receives the heated acid gas stream 126 to regenerate the solvent. In some embodiments, the regenerator 140 can include a column containing 8 to 24 trays (for example, 8, 9, 10, 11, 12, 13, 14, 15, 16, 17, 18, 19, 20, 21, 22, 23, or 24 trays). The regeneration process can occur at a pressure of about 12 to 15 psig and at the solution boiling temperature. As shown, the regenerator 140 is heated by an external source, such as an acid gas enrichment reboiler 182. The regenerator 140 separates the rich acid gas stream 126 into a hydrogen sulfide rich gas stream 142 containing liberated acid gas, hydrocarbon gas, some solvent, and water vapor. The hydrogen sulfide rich gas stream 142 is flowed through a condenser 179 to condense the solvent and water vapors. The reflux drum 180 receives the flow of liquid and gas mixture 146 to separate the acid gas 148 from the condensed liquids 150. The liquids 150 are pumped back into the regenerator 140 as reflux. The gas stream 148 exiting the reflux drum primarily includes $H_2S$ and $CO_2$. In this example system 100, the enriched acid gas stream 148 exiting from the reflux drum 180 splits at a split connector 187 to an exit stream 168 and a recycle stream 162. The exit stream 168 delivers enriched acid gas to a SRU.

As shown, the system 100 includes the recycle stream conduit 160 to deliver a recycle stream 162 containing at least a portion of the enriched acid gas 162 exiting from the reflux drum 180 back to the contactor 120 for carbon dioxide slippage, which is a process that removes carbon dioxide from a gas stream. The recycle stream conduit 160 serves as a by-pass line of the enriched acid gas 148 exiting from the reflux drum 180. The recycle stream 162 is connected with a virgin acid gas supply stream 104 entering the system at an acid gas stream connector 186 before to entering the contactor 120. In some embodiments, the recycle stream 162 and the virgin acid gas supply stream 104 can flow directly into the contactor 120 through separate conduits.

The system 100 optionally includes the acid gas recycle valve 166 coupled to the recycle stream conduit 160 to open and close a fluid pathway between the regenerator 140 and the contactor 120. The recycle valve 166 is located between the split connector 187 and the acid gas stream connector 186. The recycle valve 166 can be a pressure control valve, a flow rate control valve, or the like. The recycle valve 166 allows for a constant or periodic recycle stream of the hydrogen sulfide rich stream 162 from the regenerator 142 to be recycled back as an acid gas stream feed to the contactor 120.

As shown, the system 100 includes a controller 164 connected to the recycle valve 166 that serves to actuate the recycle valve 166 between open and closed states. The controller 164 can be coupled directed to, integrated with, or positioned proximately to the recycle valve 166 and/or the recycle stream conduit 160. In some embodiments, the controller 164 can actuate the recycle valve 166 to various partially obstructed open states to increase or decrease the flowrate of the recycle stream 162 based on a measured parameter, such as a pressure and/or flowrate of one or more streams in the system 100. In some embodiments, the controller 164 can be an optional component, where the system 100 may include the acid gas recycle valve 166 coupled to the recycle stream conduit 160 without a controller 164.

The controller 164 can be programmed to actuate the recycle valve 166 based on pressure, flowrate, and/or component compositions of a fluid steam in the system 100. For example, in some embodiments, the controller 164 can be a pressure or flowrate valve controller that actuates between the open and closed states based on pressure or flowrate, respectively. In some embodiments, the controller 164 can be programmed to actuate the recycle valve 166 based on the volumetric rate of an acid gas stream 104,106 entering the contactor 120, and/or acid gas stream 148,162 leaving the regenerator 140 and the reflux drum 180. The acid gas steam 104,106 entering the contactor 120 can include a combined acid gas stream 106 (e.g., includes both the recycle stream and the raw input stream), or an individual acid gas stream (not shown).

In some embodiments, the controller 164 can open or close the recycle valve 166 based on $H_2S$ content in the recycle stream 162 (e.g., a hydrogen sulfide rich stream). For example, certain configurations of the controller 164 can open the recycle valve 166 when a measured pressure at the recycle valve 166 exceeds a specific pressure value, such as the pressure of the contactor. In some embodiments, the controller 164 can open the recycle valve 166 when the $H_2S$ content in the recycle stream 162 is 35% wt. or less. In some embodiments, the controller 164 can open the recycle valve 166 when the $H_2S$ content in recycle stream 162 is greater than or equal to 75% wt. In some embodiments, wherein the controller 164 can open the recycle valve 166 when the $H_2S$ content in the carbon dioxide rich stream 122 is about 500 ppm or greater. In some embodiments, the controller can open the recycle valve based on a total mass flow of an input stream (for example, the recycled enriched gas from amine regenerator can reach 20% wt or greater than the acid gas feed stream to amine contactor).

In some embodiments, the controller 164 can be programmed to actuate the recycle valve 166 based on an algorithm that includes one or more parameters, including pressure, flowrate, mass flow, and component compositions of a fluid steam in the system 100. For example, The controller 164 can be programmed with a logic control pressure valve that operate the recycle valve 166 using a mathematical formula in which a controller set point is based on the contactor pressure, contactor solvent (e.g., amine acid) gas volumetric flowrate, and the contactor solvent (e.g., amine acid) composition. The formula can include a volumetric flowrate adjustment factor that is based on the composition of the amine used in the system 100. An exemplary algorithm can include a pressure valve set point for actuating (closing) the recycle valve 166 based on the contactor pressure and/or the amine acid gas volumetric flowrate, as shown in the following equations:

$$\text{Set point} > \text{contactor pressure} + 3 \text{ psig, or} \quad (Eq. 1)$$

$$\text{Set point} > \text{amine acid gas volumetric flowrate} \times 0.1978 \quad (Eq. 2)$$

Figure 2:
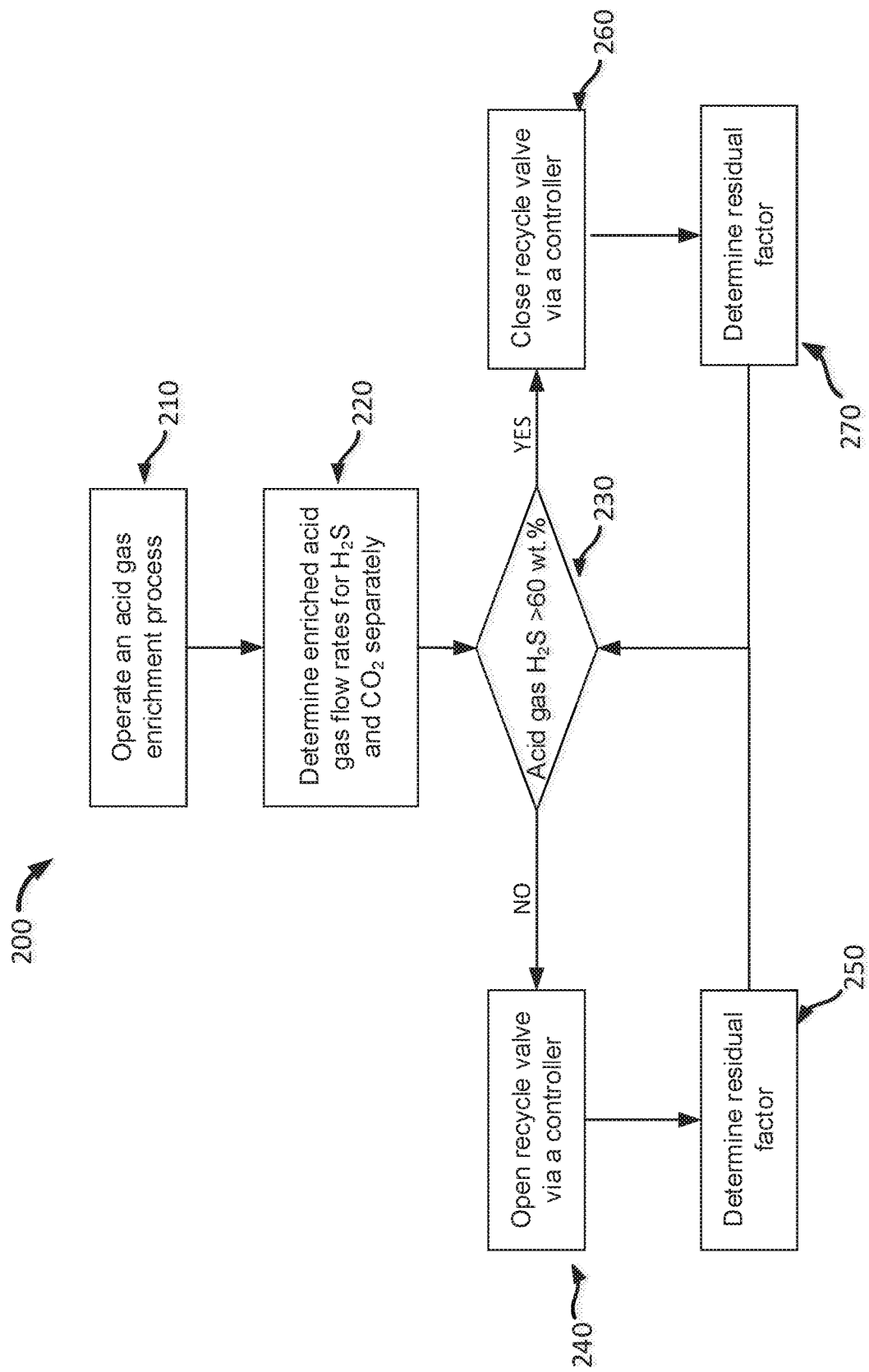
FIG. 2 is a flowchart of an example recycle-flow decision method associated with an acid gas enrichment process.

FIG. 2 provides a flowchart of an exemplary recycle-flow decision method 200 associated with an acid gas enrichment process that uses a recycle valve controller, as described in this document. The recycle valve controller can be a flowrate and/or a pressure controller. As shown in FIG. 2, the method 200 includes operating a gas treatment process, such as an acid gas enrichment process (Step 210). The enriched acid gas flow rates for acid gas, $H_2S$, and carbon dioxide, $CO_2$, in the process are separately determined (Step 220). When the acid gas $H_2S$ is greater than a desired set point, the recycle valve controller closes the recycle valve (Step 230). As depicted in Step 230, an acid gas $H_2S$ weight percentage that is greater than 60 wt. % is the desired set point for the method 200 in certain embodiments. When the acid gas $H_2S$ is outside the range of the desired set point (for example, when the acid gas $H_2S$ weight percentage is equal to or less than 60 wt. %), the recycle valve controller opens the recycle valve (Step 240). In some embodiments, the process can optionally include determining a residual factor (Step 250, or Step 270), which is a comparative measurement that compares the enriched acid gas flow rates for $H_2S$ and $CO_2$ as calculated in a predicted model to measured data collected from the gas treatment operation. The residual factor verifies that the recycle valve controller is accurately opening and closing the recycle valve based on the desired set point. Assuming the residual factor is within an acceptable level and the acid gas $H_2S$ is outside the desired set point (acid gas <60 wt. %), the recycle valve will be in an open state (Step 240). Alternatively, when the acid gas $H_2S$ is within the desired set point (acid gas >60 wt. %), the recycle valve will be in a closed state (Step 260). Furthermore, the recycle valve controller will periodically remeasure the enriched acid gas flow rates for $H_2S$ and $CO_2$ in the gas treatment process (Step 230), and will close or open recycle valve (Steps 240, 260) accordingly.

Figure 3A:
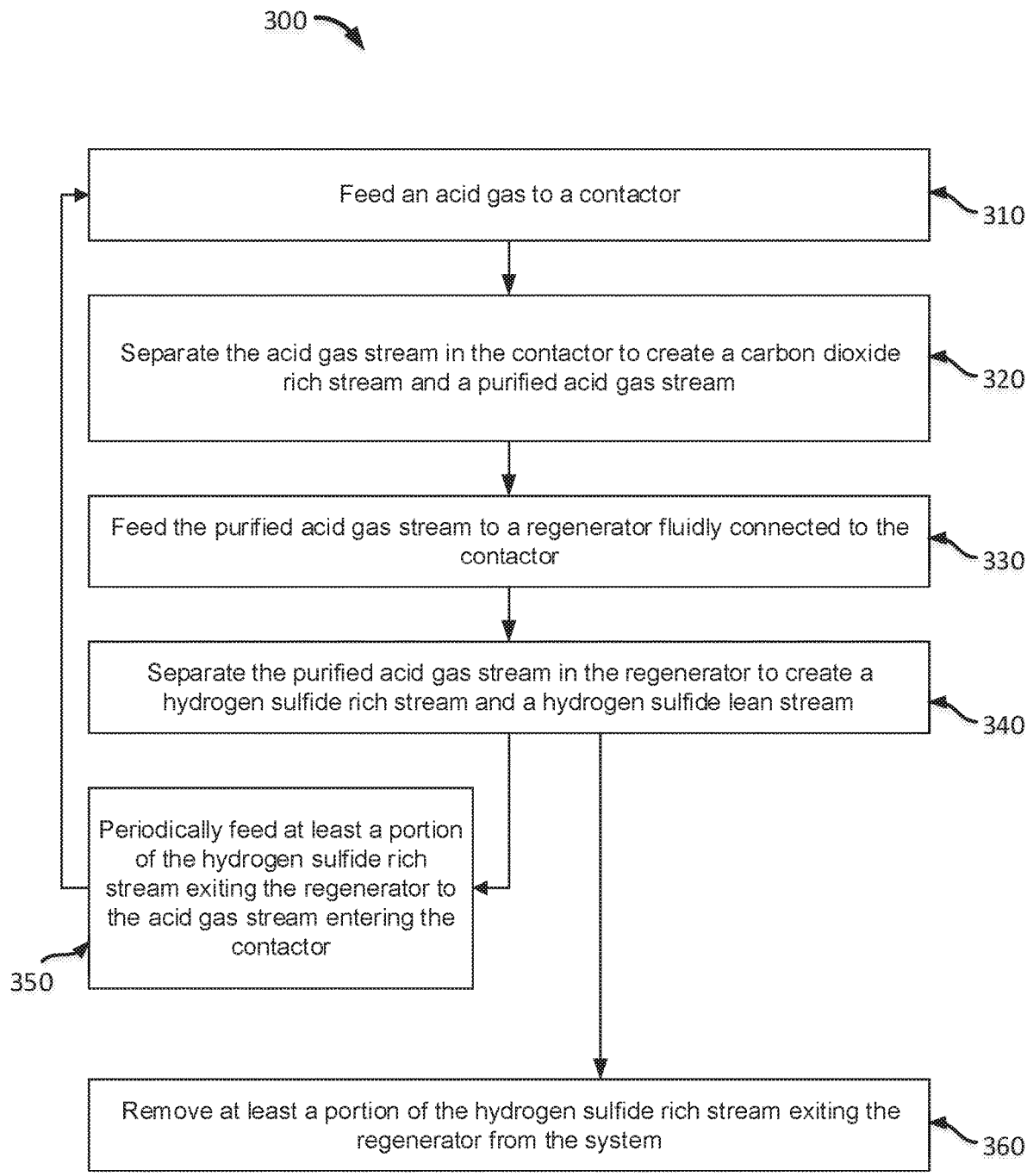
FIGS. 3A and 3B are flowcharts of an example method of sulfur enriching an acid gas stream in an acid gas enrichment system.
Figure 3B:
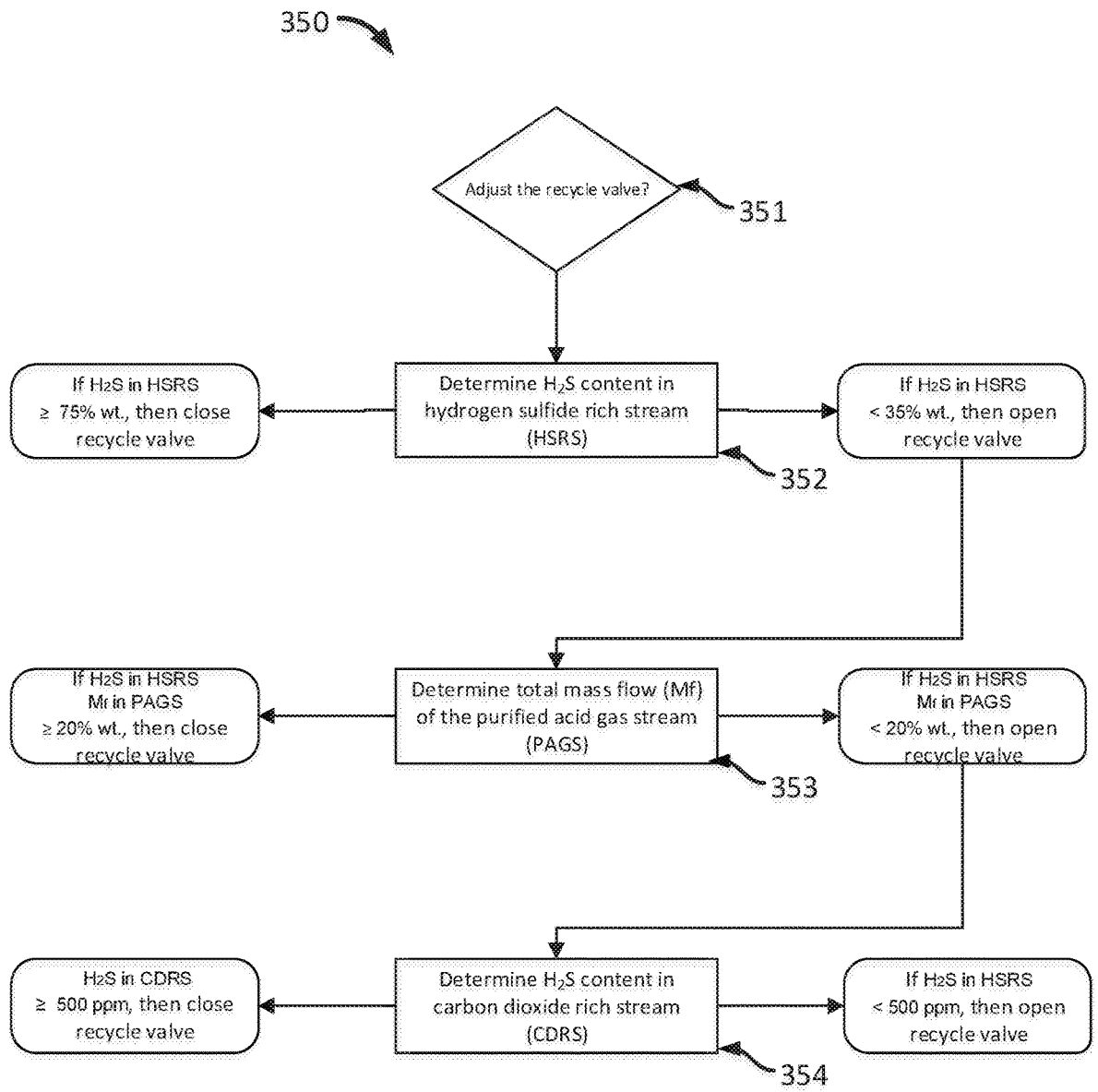

FIGS. 3A and 3B are flowcharts of an exemplary method 300 of sulfur enriching an acid gas stream using an acid gas enrichment system, as described in this document. As depicted in FIG. 3A, the method 300 includes feeding an acid gas stream to a contactor (Step 310). The acid gas stream can include hydrogen sulfide, $H_2S$, carbon dioxide, $CO_2$, and hydrocarbons. The method 300 also includes separating the acid gas stream in the contactor to create a carbon dioxide rich stream and a purified acid gas stream (Step 320). The method includes feeding the purified acid gas stream to a regenerator fluidly connected to the contactor (Step 330), and separating the purified acid gas stream in the regenerator to create a hydrogen sulfide rich stream and a hydrogen sulfide lean stream (Step 340). The method 300 also includes periodically feeding at least a portion of the hydrogen sulfide rich stream exiting the regenerator to the acid gas stream entering the contactor (Step 350).

As shown in FIG. 3B, the periodic feeding step 350 includes determining whether to adjust a recycle valve disposed along a fluid pathway that directs the hydrogen sulfide rich stream exiting the regenerator to the acid gas stream entering the contactor (step 351). In some embodiments, adjusting the recycle valve includes adjusting the recycle valve based on the H₂S content in the hydrogen sulfide rich stream (step 352). As shown, adjusting the recycle valve can also include closing the recycle valve based on the H₂S content in the hydrogen sulfide rich stream being greater than or equal to 75% wt, in some embodiments. Alternatively, adjusting the recycle valve can include opening the recycle valve based on the H₂S content in the hydrogen sulfide rich stream being less than about 35% wt. (e.g., less than about 30% wt., less than about 25% wt., less than about 20% wt., less than about 15% wt., less than about 10% wt., or less than about 5% wt.).

Still referring to FIG. 3B, adjusting the recycle valve includes closing the recycle valve when the total mass flow of the recycled enriched gas from amine regenerator is greater than or equal to 20% wt. of the acid gas feed to the amine contactor (Step 353), or when the H₂S content in the carbon dioxide rich stream is greater than or equal to 500 ppm (Step 354). In some embodiments, adjusting the recycle valve includes closing the recycle valve when the H₂S content in the carbon dioxide rich stream is greater than or equal to 650 ppm, or 900 ppm. Criterion for adjusting the recycle valve are not limited to only the examples described above and can include criterion based on a component weight percent content, flow rate, or pressure value.

Referring back to FIG. 3A, the example method also includes removing at least a portion of the hydrogen sulfide rich stream exiting from the regenerator from the system. In some embodiments, the removing of the hydrogen sulfide rich stream from the system occurs periodically based on a desired time frame (for example, once a day, month, or year), or based on a given component weight percent content, flow rate, or pressure value.

EXAMPLE 1

Table 2 provides a first example of operating conditions and gas compositions of various streams of a system, as obtained by simulation models developed in accordance with the system shown in FIG. 1.

TABLE 2

| | Stream | | | | |
|---|---|---|---|---|---|
| | 104 | 106 | 122 | 162 | 168 |
| Std. Vapor Vol. Flow (MMSCFD) | 1.40 | 1.72 | 1.19 | 0.29 | 0.29 |
| T (Deg. F.) | 91.3 | 91.6 | 133.05 | 95.9 | 95.9 |
| P (psia) | 17.5 | 12.6 | 11.5 | 12.6 | 12.6 |
| Component | | | | | |
| Hydrogen sulfide (mol. %, unless indicated otherwise) | 9.2 | 15.9 | 269.28 ppm | 44.5 | 44.5 |
| Carbon dioxide (mol. %) | 87.1 | 80.5 | 89.7 | 52.3 | 52.3 |
| Hydrogen sulfide (Mass flow, kg/d) | 5248.4 | 11198.0 | 13.1 | 5181.6 | 5181.6 |

In this first example, the controller was programmed to open and close of the recycle valve to achieve a hydrogen sulfide concentration level and mass flow in the enriched acid gas stream (Stream 168) of 44.5% mol. and 5,181 kilograms per day (kg/d), respectively.

EXAMPLE 2

Table 3 provides a second example of operating conditions and gas compositions of various streams of a system, as obtained by simulation models developed in accordance with the system shown in FIG. 1. In this second example, the controller was programmed to open and close of the recycle valve to achieve a hydrogen sulfide concentration level and mass flow in the enriched acid gas stream (Stream 168) of 47.8% mol. and 6,819 kilograms per day (kg/d), respectively.

TABLE 3

| | Stream | | | | |
|---|---|---|---|---|---|
| | 104 | 106 | 122 | 162 | 168 |
| Std. Vapor Vol. Flow (MMSCFD) | 1.44 | 1.79 | 1.17 | 0.35 | 0.35 |
| T (Deg. F.) | 91.3 | 91.6 | 133.04 | 95.9 | 95.9 |
| P (psig) | 17.5 | 12.6 | 11.5 | 12.6 | 12.6 |
| Component | | | | | |
| Hydrogen sulfide (mol. %, unless indicated otherwise) | 11.8 | 18.8 | 388.41 ppm | 47.8 | 47.8 |
| Carbon dioxide (mol. %) | 84.7 | 77.7 | 89.7 | 49.0 | 49.0 |
| Hydrogen sulfide (Mass flow, kg/d) | 6831.9 | 13651.0 | 18.4 | 6819.1 | 6819.1 |

EXAMPLE 3

Table 4 below provides a third example of operating conditions and gas compositions of various streams of a system, as obtained by simulation models developed in accordance with the system shown in FIG. 1. In this third example, the controller was programmed to open and close of the recycle valve to achieve a hydrogen sulfide concentration level and mass flow in the enriched acid gas stream (Stream 168) of 51.6% mol. and 9,454 kilograms per day (kg/d), respectively.

TABLE 4

| | Stream | | | | |
|---|---|---|---|---|---|
| | 104 | 106 | 122 | 162 | 168 |
| Std. Vapor Vol. Flow (MMSCFD) | 1.50 | 1.74 | 1.13 | 0.44 | 0.45 |
| T (Deg. F.) | 91.3 | 91.3 | 133.02 | 95.9 | 95.9 |
| P (psig) | 17.5 | 12.6 | 11.5 | 12.6 | 12.6 |
| Component | | | | | |
| Hydrogen sulfide (mol. %, unless indicated otherwise) | 15.5 | 20.4 | 461.8 ppm | 51.6 | 51.6 |
| Carbon dioxide (mol. %) | 84.7 | 76.1 | 89.6 | 45.3 | 45.3 |
| Hydrogen sulfide (Mass flow, kg/d) | 9460.8 | 14440.0 | 21.2 | 9454.4 | 9454.4 |

Figure 4:
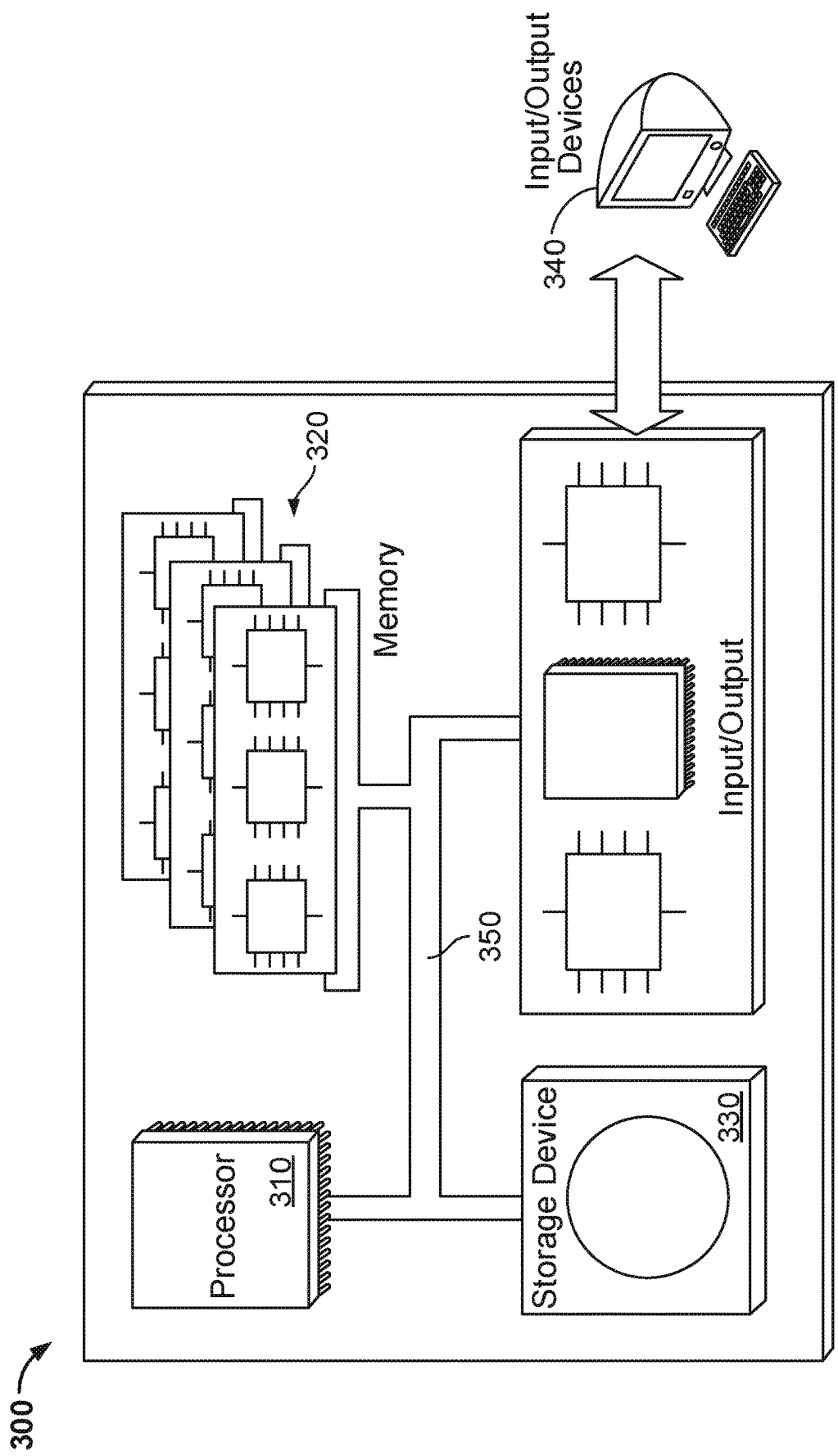
FIG. 4 is a schematic illustration of an example controller for an acid gas enrichment system that recycles enriched acid gas to optimize the hydrogen sulfide content in the enriched acid gas.

FIG. 4 is a schematic illustration of an example controller 300 (or control system) for an acid gas enrichment system that recycles enriched acid gas to optimize the hydrogen sulfide content in the enriched acid gas. In some aspects, the controller 300 may include the controller 330 shown in FIG. 4.

The controller 300 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 300 includes a processor 310, a memory 320, a storage device 330, and an input/output device 340. Each of the components 310, 320, 330, and 340 are interconnected using a system bus 350. The processor 310 is capable of processing instructions for execution within the controller 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the controller 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the controller 300. In one implementation, the storage device 330 is a computer-readable medium. In various different implementations, the storage device 330 may be a floppy disk device, a hard disk device, an optical disk device, or a tape device.

The input/output device 340 provides input/output operations for the controller 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The invention claimed is:

1. A system of acid gas enrichment, the system comprising:
   an acid gas stream connector configured to receive an acid gas stream;
   a contactor configured to separate the acid gas stream received from the acid gas stream connector into a carbon dioxide rich stream and a purified acid gas stream, the acid gas stream comprising hydrogen sulfide ($H_2S$), carbon dioxide ($CO_2$), and hydrocarbons;
   a regenerator in fluid communication with the contactor such that the regenerator is configured to separate the purified acid gas stream to obtain a hydrogen sulfide rich stream and a hydrogen sulfide lean stream, the hydrogen sulfide rich stream having a concentration of hydrogen sulfide;
   a recycle stream conduit fluidly coupled between the regenerator and the contactor, and configured to supply at least a portion of the hydrogen sulfide rich stream from the regenerator to the contactor; and
   an acid gas recycle valve coupled to the recycle stream conduit that opens and closes a fluid pathway from the regenerator to the contactor based on an $H_2S$ content in the hydrogen sulfide rich stream to direct the hydrogen sulfide rich stream exiting the regenerator to combine with the acid gas stream at the acid gas stream connector prior to the combination of the hydrogen sulfide rich stream and the acid gas stream entering the contactor.

2. The system of claim 1, wherein the system comprises a single contactor.

3. The system of claim 1, wherein the system is exclusive of a vacuum spool or a compressor for the contactor.

4. A system of acid gas enrichment, the system comprising:
   an acid gas stream connector configured to receive an acid gas stream;
   a contactor connected to the acid gas stream connector by a conduit, the contactor configured to separate the acid gas stream from the acid gas stream connector into a carbon dioxide rich stream and a purified acid gas stream, the acid gas stream comprising hydrogen sulfide ($H_2S$), carbon dioxide ($CO_2$), and hydrocarbons;
   a regenerator in fluid communication with the contactor, the regenerator configured to separate the purified acid gas stream to obtain a hydrogen sulfide rich stream and a hydrogen sulfide lean stream, the hydrogen sulfide rich stream having a concentration of hydrogen sulfide;
   a recycle valve positioned in another conduit between the regenerator and the acid gas stream connector to direct the hydrogen sulfide rich stream exiting the regenerator to combine with the acid gas stream at the acid gas stream connector prior to the combination of the hydrogen sulfide rich stream and the acid gas stream entering the contactor; and
   a controller configured to operate the recycle valve based on an $H_2S$ content in the hydrogen sulfide rich stream, wherein the recycle valve, when in an open state, is configured to separate at least a portion of the hydrogen sulfide rich stream exiting from the regenerator and to feed the portion of the hydrogen sulfide rich stream to the contactor, and wherein the recycle valve, when in an closed state, is configured to purge an entire hydrogen sulfide rich stream exiting from the regenerator.

5. The system of claim 4, wherein the controller is configured to open, partially open, or close the recycle valve.

6. The system of claim 4, wherein the controller is configured to open the recycle valve when the $H_2S$ content in the hydrogen sulfide rich stream is less than 35% wt.

7. The system of claim 4, wherein the controller is configured to close the recycle valve when the $H_2S$ content in the hydrogen sulfide rich stream is greater than or equal to 75% wt.

8. The system of claim 4, wherein the controller is configured to close the recycle valve when an $H_2S$ content in the carbon dioxide rich stream is greater than or equal to 500 ppm.

9. The system of claim 4, wherein the controller is configured to close the recycle valve when a total mass flow of the recycled hydrogen sulfide rich stream from the regenerator is 20% wt. or greater than the acid gas stream to the contactor.

10. The system of claim 1, wherein the acid gas recycle valve is configured to open when the $H_2S$ content in the hydrogen sulfide rich stream is less than 35% wt.

11. The system of claim 1, wherein the acid gas recycle valve is configured to open when the $H_2S$ content in the hydrogen sulfide rich stream is greater than or equal to 75% wt.

12. The system of claim 1, wherein the acid gas recycle valve is configured to open when an $H_2S$ content in the carbon dioxide rich stream is greater than or equal to 500 ppm.

13. The system of claim 1, wherein the acid gas recycle valve is configured to close when at least one of:
   the $H_2S$ content in the hydrogen sulfide rich stream is greater than or equal to 75% wt;
   a threshold mass flow of the recycled hydrogen sulfide rich stream from the regenerator is 20% wt or greater than a mass flow of the acid gas stream to the contactor; or
   an $H_2S$ content in the carbon dioxide rich stream is at least 500 ppm.

14. The system of claim 1, wherein the acid gas recycle valve is configured to close when:
   the $H_2S$ content in the hydrogen sulfide rich stream is greater than or equal to 75% wt;
   a threshold mass flow of the recycled hydrogen sulfide rich stream from the regenerator is 20% wt or greater than a mass flow of the acid gas stream to the contactor; and
   an $H_2S$ content in the carbon dioxide rich stream is at least 500 ppm.

15. The system of claim 1, wherein the acid gas recycle valve is configured to open or close based on an operating pressure of the contactor.

16. The system of claim 4, wherein the controller is configured to determine a residual factor based on a flow rate of the hydrogen sulfide rich stream and a flow rate of the carbon dioxide rich stream.

17. The system of claim 16, wherein the residual factor comprises a comparative measurement that compares flow rates of the hydrogen sulfide rich stream and the carbon dioxide rich stream in a predicted model to measured flow rates of the hydrogen sulfide rich stream and the carbon dioxide rich stream.

18. The system of claim 16, wherein the controller is configured to:
   (i) determine that the residual factor is within an acceptable level;
   (ii) determine a measured flow rate of the hydrogen sulfide rich stream is outside of an acceptable level; and
   (iii) based on the determinations in (i) and (ii), adjust the recycle value toward an open state or maintaining the recycle valve at the open state.

19. The system of claim 16, wherein the controller is configured to:
   (i) determine that the residual factor is within an acceptable level;
   (ii) determine a measured flow rate of the hydrogen sulfide rich stream is within an acceptable level; and
   (iii) based on the determinations in (i) and (ii), adjust the recycle value toward a closed state or maintaining the recycle valve at the closed state.

20. The system of claim 16, wherein the controller is configured to open or close the recycle valve based on an operating pressure of the contactor.

\* \* \* \* \*